United States Patent Office 3,219,099
Patented Nov. 23, 1965

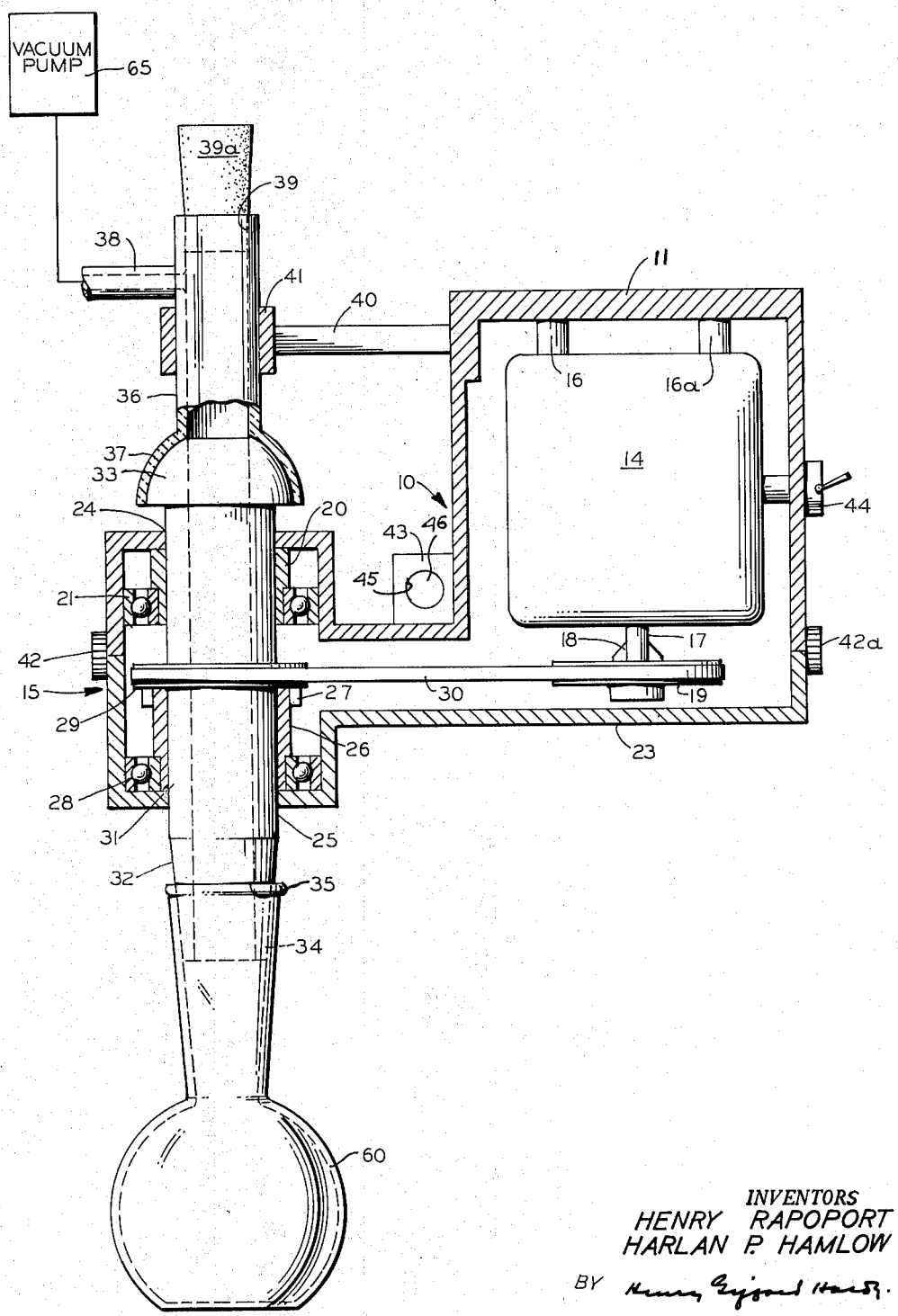

3,219,099
ROTARY EVAPORATOR AND SEPARATOR
Harlan P. Hamlow, 920 Hilldale, and Henry Rapoport,
6 Hillcrest Court, both of Berkeley, Calif.
Filed Aug. 11, 1961, Ser. No. 130,852
1 Claim. (Cl. 159—6)

This invention relates generally to separators and evaporators and more particularly to an improved apparatus for use in separating and removing the separable components in a composition of matter.

Machines utilizing centrifugal force to separate components having different specific gravities are well-known. Such machines have been in common use in the laundry and dry cleaning industries for separating and removing water or dry cleaning fluids from fabric. Another application is in the dairy industry for separating cream from milk. Various forms of such devices, such as centrifuges and rotary evaporators, have been employed in chemical laboratories for effecting separation of gases, liquids and solids.

Such prior devices have generally been fabricated entirely of metallic components in order to provide durability with consequent long operating life, in addition to the essential cleanliness. Since it is necessary to operate such devices at high rotary speeds in order to be effective, proper lubrication between metallic moving parts is of the utmost importance. However, this presents a number of disadvantages. The oils or greases normally used have a tendency to be displaced from their lubricating positions due to heat, wear of parts, etc., and are prone to become mixed with the substance being separated or will react with one or more of the components. This is particularly true in the case of rotary evaporators. The attempt to overcome these disadvantages requires the incorporation of elaborate sealing means, resulting in bulky, expensive and complex machines, with no assurance of real effectiveness.

A further disadvantage applicable to devices used in evaporating volatile substances from a composition is that of corrosion. The volatile substances react with the metallic parts and the products of such corrosive action may become mixed with and thereby contaminate the separation being undertaken. Such corrosive action may even render a device completely inoperative, thereby necessitating the replacement of the damaged parts. Rotary evaporating devices have been made using non-metallic materials such as glass or plastics in their construction, in the attempt to overcome the corrosion problem. However, such devices have proved to be unsatisfactory in operation from the standpoint of durability and reliability without solving the important factor of lubrication.

Accordingly, it is an object of the present invention to provide an apparatus which utilizes centrifugal force and low pressure, and provides a continually extended surface to separate and remove selected components from a composition.

It is another object of the present invention to provide an apparatus which is readily adaptable for use with standard vessels and containers so as to cause the removal of certain components from a composition contained therein.

It is a further object of the present invention to provide a durable rotary apparatus having components made of corrosion and heat resistant materials for separating volatile components of a composition.

Yet another object of the present invention is to provide a rotary apparatus for separating components of a composition whereby contamination of such composition is avoided by eliminating the necessity of lubricants at the coupling areas of the various parts of the apparatus.

A still further object of the present invention is to provide a combined rotary separator and evaporator wherein the coupling means between an external vacuum system and a vessel containing the composition comprises a heat and corrosion resistant, hollow, self-lubricating shaft adapted for rotation in a concave hemispherical glass socket to thereby provide an air-tight and lubricant-free coupling connection, requiring no separate or other sealing means.

Further objects are to provide a construction of maximum simplicity, economy, and ease of manufacture, also such further objects, advantages, and capabilities as will fully appear and as are inherently possessed by the apparatus and the invention described herein.

Invention further resides in the combination, construction and arrangement of parts illustrated in the accompanying drawing, and while there is shown therein a preferred embodiment thereof, it is to be understood that the same is merely illustrative of the invention and that the invention is capable of modification and change, and comprehends other details of construction without departing from the spirit thereof or the scope of the appended claims.

Referring to the drawing:

The single figure of the drawing is a partial vertical section in schematic form, of the preferred embodiment of the present invention.

The embodiment of the present invention herein described and illustrated is primarily adapted for use in chemical laboratories, or the like, and consists essentially of a rotatably mounted hollow, vinyl resin shaft cooperating with a fixed member made of glass, plastic, metal or the like, having a concave joint for providing a ball and socket coupling between the rotating shaft, and a flask containing the composition to be separated. The fixed member is coupled to a vacuum pump for drawing off the volatile vapors. The shaft is provided with means for attaching a flask or other suitable vessel and both are rotated by power means to establish a continually extended surface of the composition on the inner wall of the flask to assist in the separation of the selected components thereof. The composition in the flask may be heated by suitable heating means (not shown) as it is being rotated, and the resulting volatile vapors may then be drawn off through the shaft and fixed member by the vacuum pump which provides the vacuum for the system. Neither the shaft nor the fixed member, nor the juncture between the two will be affected by corrosive characteristics of the volatile vapors passing therethrough, since both are formed from materials which are inherently durable and offer satisfactory resistance to chemicals, solvents and heat.

In addition, the coefficient of friction between the plastic shaft and the fixed joint is extremely low since the vinyl resin shaft is self-lubricating, so that no lubricating oils or greases are needed over the area of contact.

In this manner, the problem of lubricating oils or greases leaking into or otherwise combining with the composition in the flask or reacting with the rising volatile vapors, is eliminated. Furthermore, this arrangement permits a closer fit between the shaft and the fixed point to thereby provide the air-tight connection required to allow the vacuum pump to operate at peak efficiency.

The ball and socket joint between the rotating member and the stationary member of the unit, operated by the pulley system, ensures a jam proof operation.

Referring now to the single figure of the drawing, there is shown a housing comprising an upper shell 11 cooperating with and secured to a lower shell 23 secured together by means indicated at 42 and 42a, thereby providing a compartment 10 and a compartment 15 with a communicating passage 25 therebetween. The housing may be supported on a laboratory work bench, or the like, by means of the mounting block 43 which is secured to the housing, which block has a transverse aperture 45 therethrough for a mounting bar 46. Suitable conventional holding means may be provided to hold the housing in any adjusted position rotated around the mounting bar 46.

Compartment 15 is essentially a bearing housing and is provided with an opening 24 in the top portion thereof which is axially aligned with a similar opening 25 in the bottom portion thereof, to allow a hollow shaft 32 to be inserted into and extend through compartment 15. Shaft 32 is formed from a suitable plastic material, preferably a polyfluorovinyl resin, i.e., "Teflon" which is a product of E. I. du Pont Company, which offers durability, extreme resistance to chemicals, solvents, and heat, and is self-lubricating. Another example of a commercially available vinyl resin useful in the present invention is "Delrin" produced by the E. I. du Pont Company. Shaft 32 has an axial passage 35 therethrough for purposes to be later described. The shaft 32 is journaled for rotation within the housing 15. An upper journal 20 and a lower journal 26 are secured by conventional means to the shaft 32 and cooperate with an upper ball bearing 21 and a lower ball bearing 28, permitting shaft 32 to rotate freely at high or low rotational speeds. It is important that the bearings be in proper rotational alignment and that they be far enough apart to minimize any rotational misalignment or wobble.

The lower end 34 of shaft 32 is suitably shaped and finished to make an airtight fit with the standard taper of commercial laboratory flasks, such as 60, in such manner that flask 60 will be rotatably but removably, secured to and supported by shaft 32. Shaft 32 is rotated by a belt driven pulley system powered by motor 14 supported in compartment 11 by suitable vibration dampening mounts 16 and 16a. Motor 14 is preferably a standard electric motor of suitable horsepower and is operably connected to a source of electricity (not shown). Switch means 44 is provided on the exterior of compartment 11 for activating motor 14. It is of course understood that suitable known means for varying the speed of rotation may be used if desired. A pulley 19 is suitably mounted on shaft 17 of motor 14 for driving a suitable drive belt 30 which drives shaft pulley 29 mounted externally on shaft 32 in conjunction with thrust bearing 27, for rotatably driving shaft 32.

The upper end of shaft 32 extends beyond the housing forming compartment 15 and is machined to form a substantially hemispherical ball portion 33. The hemispherical ball portion 33 is seated for rotation in socket 37 of the fixed glass member 36. Glass member 36 is positioned relative to and may be separated from the housing compartment 10 and in axial alignment with the tubular member 32 by a suitable mounting bar 40 and mounting collar 41. The axial passage 39 in glass member 36 connects with passage 35 of shaft 32 to thereby provide a continuous uniform connection from the flask through the shaft and glass member. A conduit 38 made integrally with the glass member 36 connects passage 39 with the vacuum pump indicated generally at 65 for exhausting vapors and volatile components. Passage 39 extends entirely through glass joint member 36 in order to facilitate cleaning thereof, and provide an entry for the continuous feed of material to the flask 60. A suitable plug or stopper 39a is provided at the upper portion of passage 39 to close this opening when its use is not required. It is obvious that no composition or vapor can leak into contact with the bearings 21 and 28 to thereby hamper the operation of the apparatus.

The ball portion 33 of shaft 32 and the socket portion 37 of glass joint member 36 are respectively machined to such tolerances as to allow an extremely close fit between the two members when ball portion 33 is seated in socket 37 to thereby provide a virtually air-tight connection between shaft 32 and glass member 36. Inasmuch as the vinyl resin shaft 32 is self-lubricating, no additional lubricating oils or greases are needed between the two surfaces at the area of contact. In this manner, the problem of lubricating oils or greases leaking into the composition or reacting with the rising vapors is altogether eliminated. Furthermore, this arrangement eliminates the need for lubricant sealing means and requires no continued maintenance normally essential in prior art devices in order to ensure proper lubrication of moving parts. The respective surfaces of ball portion 33 and glass socket 37 are extremely hard and durable to thereby allow direct bearing contact between the two surfaces without the need for additional bearing means, such as ball bearings, or the like. Even though the ball portion rotates while the socket portion is retained in position, the non-lubricated contacting area provides such a fit at all times that low pressure operation is possible and practical.

In operation, the flask 60 containing the composition to be separated is securely mounted by conventional friction fit on the lower tapered end 34 of shaft 32. The composition in the flask may then be subjected to heat by suitable heating means, such as a Bunsen burner or the like (not shown), to cause the volatile substances in the composition to vaporize. At the same time or in any desired sequence, the flask may be rotated at predetermined speeds by activating switch 44 to start motor 14 and drive shaft 32 by means of pulley belt 30 mounted on pulleys 19 and 29, respectively. The volatile vapors coming from the composition will be drawn up through passages 35 and passage 39 and into conduit 38 by the vacuum pump 65. The vaporization of the composition will be enhanced by the fact that the rotation of the flask and the resulting centrifugal force on the composition will cause a portion of the composition to be forced outwardly and upwardly along the walls of the flask in the form of a relatively thin surface film, thereby exposing a much greater surface area of the composition to heat and low pressure, (if used) resulting in the rapid vaporizing of the volatile components of the composition. Frequently, it is desirable to carry out these steps at low pressures. For this purpose a source of vacuum is connected to the conduit 38. The cooperation of the several members makes it possible to operate under controlled low pressures without leaks or variation.

Thus, the present invention provides an apparatus for simultaneously evaporating and separating only the volatile substances from a composition under controlled low pressure if desired.

What is claimed is:

Apparatus for separating and removing volatile substances from a composition, in combination a housing, a shaft made of polyfluorovinyl resin rotatably mounted in said housing and with both of its ends extending beyond the limits of said housing, said shaft having a passage of substantially uniform diameter extending axially through the entire length thereof, said shaft having one end thereof removably securing a flask in airtight engagement for rotation therewith, said shaft having its opposite end formed as the ball portion of a ball and socket joint, a separately mounted glass fixed member, having an axial passage therethrough of substantially the same diameter terminating with the socket portion of the ball and socket joint rotatably receiving and seating the said ball portion of said shaft in airtight self-lubricating engagement and with their respective passages in alignment, exhaust means communicating with the passage in said fixed member connected to a source of low pressure, and drive means mounted in said housing for rotating said shaft.

References Cited by the Examiner

UNITED STATES PATENTS

| | | | |
|---|---|---|---|
| 440,752 | 11/1890 | Barotte | 159—6 |
| 2,536,676 | 2/1951 | Brown et al. | 34—58 X |
| 2,575,688 | 11/1951 | Smith | 159—6 |
| 2,797,747 | 7/1957 | Rinderer | 159—6 |
| 2,865,445 | 12/1958 | Buchler | 202—238 X |
| 3,034,573 | 5/1962 | Ueberwasser et al. | 159—6 |

FOREIGN PATENTS 1,208,225   9/1959   France.

NORMAN YUDKOFF, *Primary Examiner.*

GEORGE D. MITCHELL, CHARLES A. O'CONNELL,
*Examiners.*